United States Patent [19]

Elliott

[11] 3,914,541

[45] Oct. 21, 1975

[54] VIDEO DISC PLAYER

[75] Inventor: James E. Elliott, Los Angeles, Calif.

[73] Assignee: MCA Disco-Vision, Inc., Universal City, Calif.

[22] Filed: Dec. 11, 1972

[21] Appl. No.: 314,082

[52] U.S. Cl. .......... 178/6.6 R; 179/100.3 V; 360/99; 360/102

[51] Int. Cl.[2] ..................... H04M 1/22; G11B 21/00

[58] Field of Search ....................... 178/6.6 R, 6.6 A; 179/100.41 L, 100.2 P, 100.3 A, 100.3 B, 100.3 D, 100.3 P, 100.3 V; 340/174.1 E; 360/99, 101, 102

[56] References Cited

UNITED STATES PATENTS

| | | | |
|---|---|---|---|
| 2,137,188 | 11/1938 | Whitman | 179/100.41 L |
| 2,654,810 | 10/1953 | Miessner | 179/100.41 L |
| 3,166,997 | 1/1965 | Barcia et al. | 179/100.2 P |
| 3,361,873 | 1/1968 | Johnson et al. | 179/100.3 V |
| 3,404,224 | 10/1968 | Revelo et al. | 178/6.7 A |
| 3,537,083 | 10/1970 | Voth | 340/174.1 E |
| 3,701,135 | 10/1972 | Price | 179/100.2 P |
| 3,706,861 | 12/1972 | Giel | 340/174.1 E |
| 3,715,524 | 2/1973 | Adler | 178/6.7 A |

*Primary Examiner*—Vincent P. Canney
*Assistant Examiner*—Stewart J. Levy
*Attorney, Agent, or Firm*—Marvin H. Kleinberg

[57] ABSTRACT

A player for video disc includes an improved transducer arm and tracking assembly which is servo controlled from the playback circuits to follow the information track. An articulated mirror provides "fine" tracking control. When a thin, flexible video disc is used, a rotating turntable provides a fluid cushion bearing to support the disc. A vacuum assisted reading head assembly draws the disc toward the head and maintains an optimum head-to-disc spacing.

3 Claims, 14 Drawing Figures

VIDEO DISC PLAYER

RELATED PATENT APPLICATIONS AND PATENTS

"Video Disc Player" by James E. Elliott, Ser. No. 299,893 now U.S. Pat. No. 3,829,622, filed Oct. 24, 1972; "Video Recording and Reproducing System" by Kent D. Broadbent, Ser. No. 299,892, filed Oct. 24, 1972; "Drop-Out Compensator" by Wayne Ray Dakin, Ser. No. 299,891, filed Oct. 24, 1972; "Video Record Disc and Process for Making Same" by David P. Gregg, Ser. No. 735,007, filed Jan. 27, 1969; "Duplicating Process for Video Disc Records" by Kent D. Broadbent, U.S. Pat. No. 3.658,954, issued Apr. 25, 1972; "Video Signal Transducer Having Servo Controlled Flexible Fiber Optic Track Centering" by David P. Gregg and Keith O. Johnson, U.S. Pat. No. 3,530,258, issued Sept. 22, 1970; "Video Recording Medium and Transport" by David P. Gregg, U.S. Pat. No. 3,430,966, issued Mar. 4, 1969; "Photoelectric Transducer Head" by David P. Gregg, U.S. Pat. No. 3,349,273, issued Oct. 24, 1967; "Video Disc Playback Assembly" by Keith O. Johnson, U.S. Pat. No. 3,518,442, issued June 30, 1970; "Duplicating Process for Video Disc Records" by Kent D. Broadbent, U.S. Pat. No. 3,687,664, issued Aug. 29, 1972.

Under Patent Office Rule 79, reference is also made to the applications of Manfred Jarsen deposited Oct. 1, 1973, Ser. No. 402,634; Ser. No. 402,635; James E. Elliott filed Feb. 20, 1973, Ser. No. 333,559; and Lawrence S. Canino filed Nov. 5, 1973, Ser. No. 413,165 which claim inventions disclosed but not claimed herein, and which are owned by the assignee of the present invention.

BACKGROUND OF THE INVENTION

1. Field of the Invention

This invention relates to information retrieval apparatus and, more particularly, to a device adapted to recover the video information which has been stored on the surface of a video disc.

2. Description of the Prior Art

It has been known that color video programs can be stored on magnetic tape for subsequent playback, utilizing appropriate video tape reading apparatus. It has also been disclosed that the same information can be recorded on a disc, either through photographic or other processes which achieve a physical deformation of the disc in a predetermined pattern, which can then optically "read" to recover a video signal suitable for application to a standard TV receiver.

In the teachings of the prior art, and especially the patents to Gregg and Johnson and the application of Elliott, supra, apparatus has been disclosed which is adapted to cooperate with the video disc disclosed by Gregg, Johnson, Broadbent, et al, supra. Continued experimentation has led to the development of video disc having a surface upon which information is stored as "holes" or depressions in a surface.

On a typical video disc, a given hole may be approximately 1 micron in width. A plurality of such holes of varying lengths are placed in a more or less continuous track on a surface of a disc. The disc is adapted to rotate at approximately 1,800 rpm for playback. In alternate configurations, the disc may either have a continuous spiral track containing information or may include a plurality of discrete, circular tracks. In either embodiment, a track-to-track spacing of approximately 2 microns is maintained. At such rotational speeds, approximately 20 minutes of program can be accomodated on a 12 inch diameter disc.

In order to provide a commercially successful system, several requirements must be simultaneously satisfied. The video disc which contains the program material must be easily mass produced, able to take a certain amount of handling and must function on a playback instrument which must be reasonable in cost and sufficiently simple and rugged so that it might function in the environment of a home.

Techniques are available to mass produce discs using techniques which are analogous to those employed in the phonograph record industry. It has been determined that a video disc can be made of thin material without substantial lateral rigidity. Such a disc can accept information in a "hole-no-hole" pattern which can be optically recognized by suitable playback equipment. However, the flexibility of the thin plastic disc imposes certain requirements on the playback equipment. Because of the microscopic size of the tracks and the information recorded therein, an optical system must be provided which can discriminate between the presence or absence of a "hole" 1 micron wide in a series of similar holes. The series of holes of interest is separated from an adjacent series of holes or track by approximately 1 micron, since the distance between the centers of adjacent tracks is in the preferred embodiment approximately 2 microns.

Sufficient energy must be applied to and recovered from the surface to distinguish between the surface states that represent information, and to provide an error signal which enables a control system to maintain the transducer in alignment with the track of interest in an environment of shocks and vibration.

In order to resolve, optically, a spot that is 1 micron in width, the distance between the object plane and the optical system should be held constant to within approximately 1 micron. If now the surface of the disc cannot be held planar within a micron, it is necessary to provide some mechanism that will preserve the spacing between the disc surface and a predetermined point in the optical system.

In the prior art, utilizing a substantially rigid disc, a reading head assembly had been disclosed which included a hydrodynamic or fluid bearing which, in conjunction with a mechanical force biasing the head towards the disc surface, maintained the head at a fixed sitance from the disc with acceptable accuracy. With a nonrigid, flexible disc, it is necessary first to define the object plane in which the information track is found and then to provide a mechanism that maintains the spacing between that object plane and the optical system.

SUMMARY OF THE INVENTION

An improved playback system has been developed for reproducing video information from a flexible video disc. This improved system includes a turntable which provides a hydrodynamic fluid bearing which affords a noncontact support for the entire disc and an improved reading head which utilizes a negative pressure differential in the vicinity of the head.

The head may be considered substantially "rigid" and the disc may be deemed "compliant" in maintaining a predetermined spacing between the disc surface and the head. A fluid pressure system is responsive to the relative radial location of the playing arm to vary the pressure differential with radial location thereby maintaining a constant head-to-disc spacing independent of relative surface speeds. In alternative embodiments, a stationary back plate provides a partial fluid bearing support to the rotating disc.

An improved optical system has also been developed. A single articulated mirror of novel design is provided that enables the recorded track to be followed in the presence of relative radial displacement of the player arm and head assembly with respect to the disc of several mils of travel while following a 1 micron-wide track.

Wherein the prior art has suggested a second mirror for "fine" control of the reading path in the circumferential direction, special circuits compensate, electronically, for any irregularities of circumferential velocity that might otherwise effect the synchronism or timing of the present system. Such circuits avoid the need for a second articulated mirror in the optical path or other circumferential adjustments.

Prior art mechanisms have included a reading arm positively driven by a lead screw or other mechanism whereby the rough or "coarse" position of the reading transducer can be established, generally following a track which contains the recorded information. Further, the prior art has taught some form of controllable assembly in the arm to direct a reading beam to the surface under servo control, as a "fine adjustment" of beam position.

It has also been taught that the same optical system that directs the reading beam to the disc surface can be used to convey a reflected beam containing information to an appropriate transducer assembly.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 14 is a side view of the head and a flexible disc in operational proximity.

DESCRIPTION OF THE PREFERRED EMBODIMENTS

Figures 1, 2:
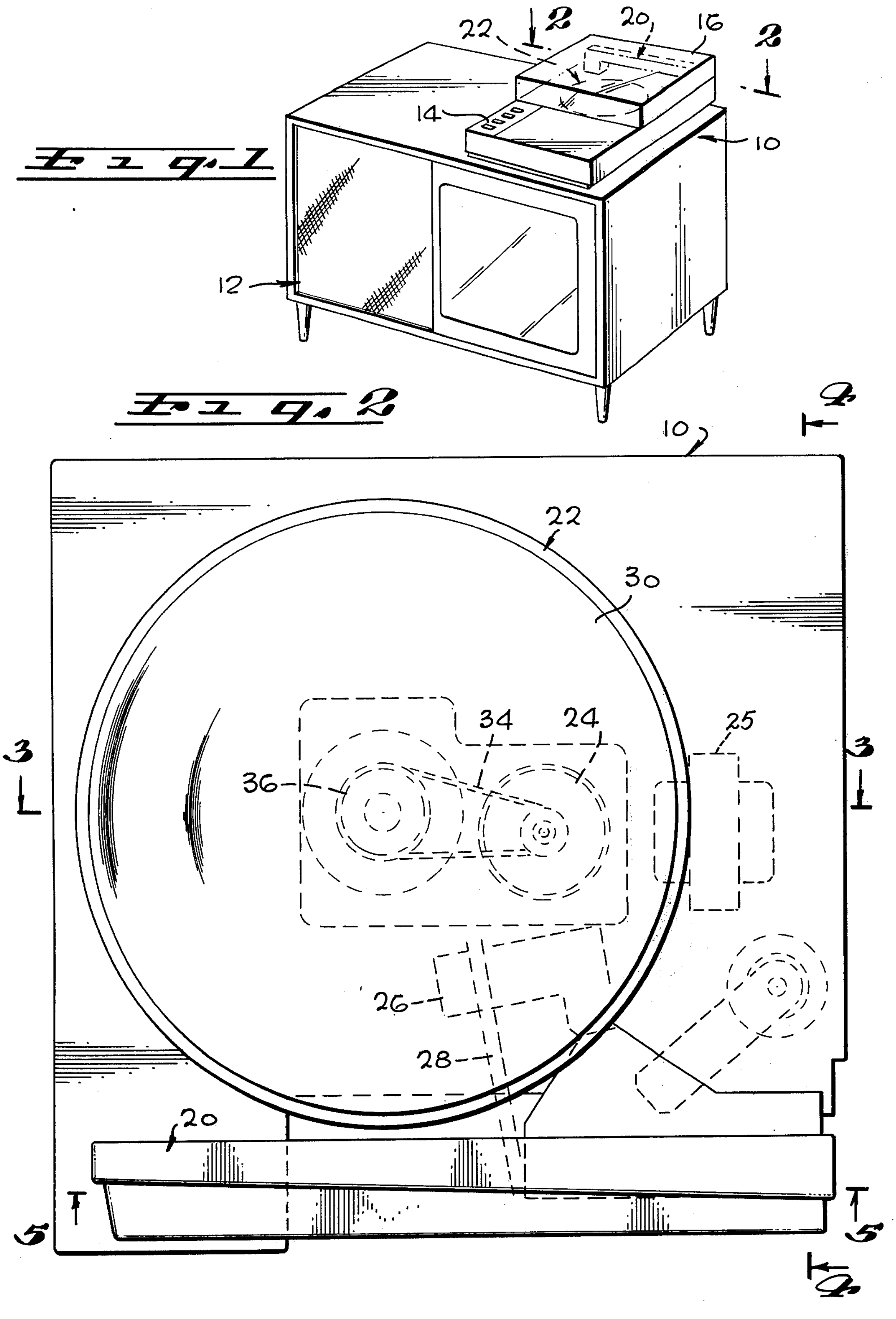
FIG. 1 is a perspective view of an improved video disc player according to the present invention.
FIG. 2 is a top sectional view of a player of FIG. 1 taken along line 2—2 in the direction of the appended arrows.

Turning first to FIG. 1, there is shown a video disc playback assembly 10 mounted on a conventional television receiver 12. The playback assembly has a control panel 14 and a dust cover 16 which enables the assembly to operate in a relatively controlled environment.

The television set 12 is a conventional TV receiver which is modified only to accept a processed video input signal from the player assembly 10, which can be directly utilized by the video and audio circuits of the receiver.

It is contemplated that the video and audio information signals provided by the player 10 will be indistinguishable from video and audio signals which are recovered from a radiated transmission of a TV program.

In FIG. 2, there is shown in somewhat greater detail the operable elements of the player assembly 10. As shown, there is a player arm 20 which is arranged to move in the radial direction. A turntable 22 adapted to carry the video disc and rotate it, in the preferred embodiment, at 1,800 rpm, provides the high relative linear speed necessary to recover recorded video information from a medium, such as a video disc.

A drive motor 24 is coupled to rotate the turntable. A separate motor 25 provides an output to a transmission assembly 26. The transmission assembly 26 has an output that controls the radial motion of the player arm 20 as a function of rotations of a turntable. As shown, a lead screw 28 is provided that moves the arm by a radial increment for each revolution of the turntable.

The transmission 26 includes a mechanism for driving the arm 20 at a higher speed in either direction so that a first speed is available for playing back a video signal, and a second, higher speed is available for bringing the player arm to the disc and returning the arm to a rest position after the disc has been "played."

Figure 3:
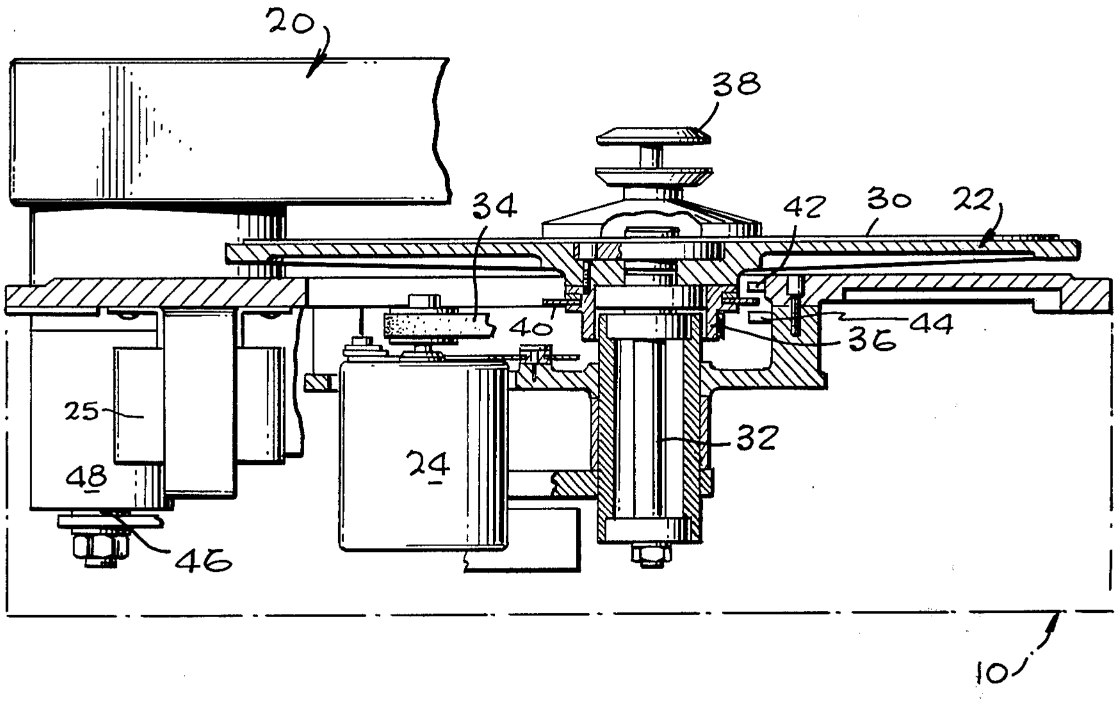
FIG. 3 is a side-section view of the player of FIG. 2 taken along the line 3—3 in the direction of the appended arrows.
Figure 4:
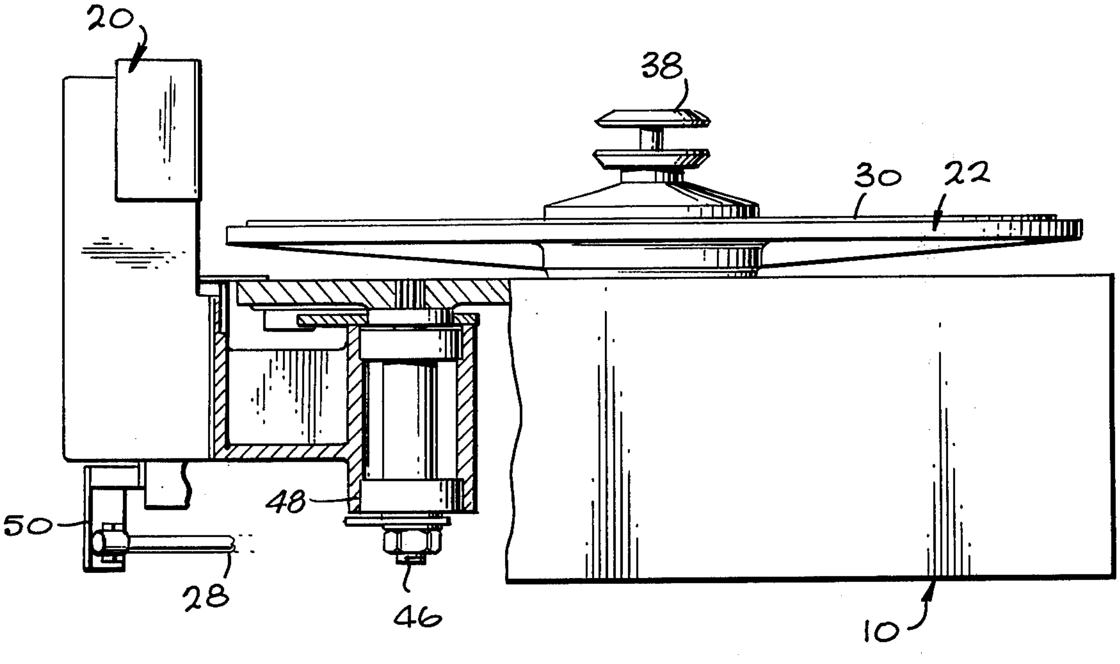
FIG. 4 is an end-section view of the player of FIG. 2 taken along the line 4—4 in the direction of the appended arrows.

In FIGS. 3 and 4, the turntable portion of the player assembly 10 is shown in greater detail. While many structural elements are illustrated, it is believed that a detailed, piece-by-piece description of the structure is not necessary to an overall understanding of the present invention. Accordingly, although detailed drawings have been included, the descriptions will be more general.

As shown, the turntable 22 is mounted on a spindle 32 mounted in suitable bushings and bearings to enable the turntable 22 to rotate at its preferred speed of approximately 1800 rpm. A drive belt 34 couples the motor 24 to a suitable drive pulley 36, which is an integral part of the turntable 22. A spindle clamp 38 mounts on the turntable 22 and is adapted to constrain the video disc 30 in place and to prevent its movement relative to the turntable 22.

In order to maintain an accurate control on disc speed, it has been found desirable to provide a tachometer controlled servo system which utilizes a perforated tachometer disc 40 mounted on the pulley 36. A light source 42 is positioned on one side of the tachometer disc 40 and a photo cell pickup 44 is positioned on the opposite side of the disc 40. The photocell 44 is coupled to a servo system which includes a crystal controlled oscillator in a phase locked loop which drives the motor 24.

In FIG. 4 there is shown, in slightly greater detail, the attachment of the player arm 20 to the player 10. A shaft 46 is mounted on the player, and the player arm 20 is attached to the shaft 46 through a suitable elongated collar 48 from which the player arm 20 is cantilevered. As shown, the lead screw 28 is shown pivotally mounted to a depending bracket 50 extending from the base of the arm 20.

As the lead screw 28 is acted upon by the transmission assembly 26, the arm assembly 20 is caused to rotate about its shaft 46, and the reading head then translates relative to the disc 30 surface, in a substantially radial direction.

Figures 5, 6:
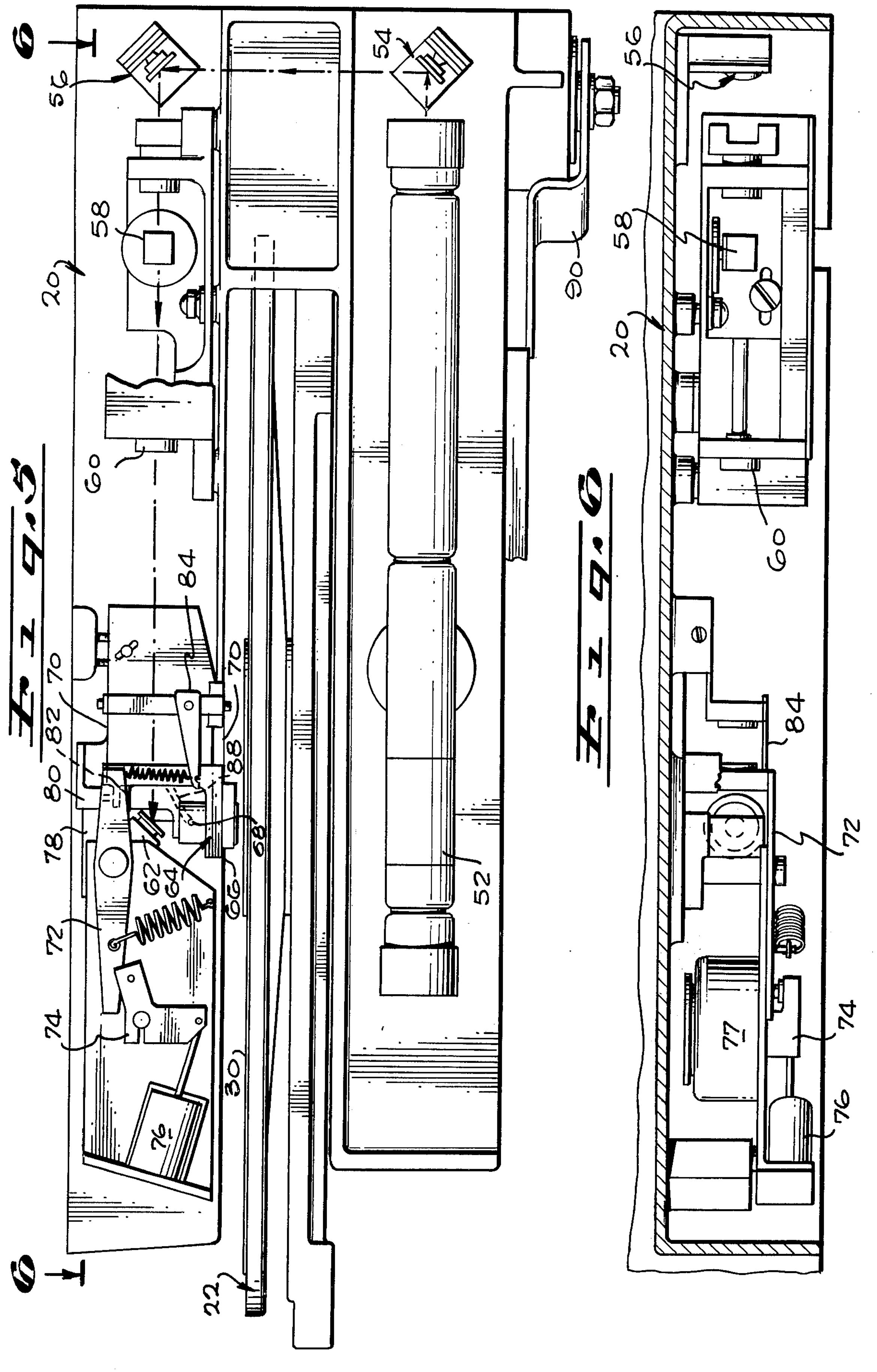
FIG. 5 is a side-section view of the player arm of FIG. 2 taken along the line 5—5 in the direction of the appended arrows.
FIG. 6 is a top view, partly broken away, of the player arm of FIG. 5 taken along the line 6—6 in the direction of the appended arrows.

Turning next to FIGS. 5 and 6, there is shown in greater detail the elements of the player arm 20 illustrated in operable cooperation with the turntable 22. As seen, the turntable 22 has the video disc 30 mounted thereon. The player arm 20 includes a radiant energy source 52 shown here as a laser whose output beam is directed through first and second mirrors 54, 56 to the upper half of the player arm 20.

The optical path includes a beam splitter 58, a quarterwave plate 60, and an articulated mirror assembly 62. The articulated mirror assembly 62 directs the laser beam through a lens assembly 64, which is an integral part of the reading head 66. A vacuum orifice 68 is adapted to be coupled through suitable flexible tubing conduit 88 to a suitable vacuum pump (not shown).

The head, as shown, is supported from the player arm 20 by a pair of flexible leaf springs 70. These leaf springs 70 are insufficient by themselves to support the weight of the reading head 66, and accordingly, additional apparatus is provided to support the head 66 when information is not being read from the disc 30. When information is being read, a hydrodynamic bearing is formed between the head 66 and the disc 30 which could support the weight of the head 66.

A lever arm 72 which is coupled to the reading head 66 and which operates through a linkage 74 coupled to a dash pot 76, normally supports the reading head 66. When it is desired to release the head 66, a solenoid 77 (in FIG. 6) operates upon the linkage 74 which rotates the arm 72 lowering the head 66 until a stop member 78, carried by the head 66, engages a supporting plate 80 of the player arm 20.

The head 66 is then constrained to ride at some fixed distance from the player arm which is controlled by the adjustment of the stop member 78. A tab 82 is carried by the arm 72 which enables the arm to cam the head 66 upwards. A bias lever 84 is coupled through a bias spring 86 which is fastened to the reading head 66 and urges the head downward toward the disc 30.

A vacuum pump (not shown) is coupled to the vacuum orifice 68 through a suitable conduit 88. The amount of the vacuum drawn from the head 66 is determined by a cam follower apparatus 90 which regulates the vacuum as a function of arm radial travel, comparable to the cam controlled bias shown in the Elliott Ser. No. 299,893, supra.

Figure 7:
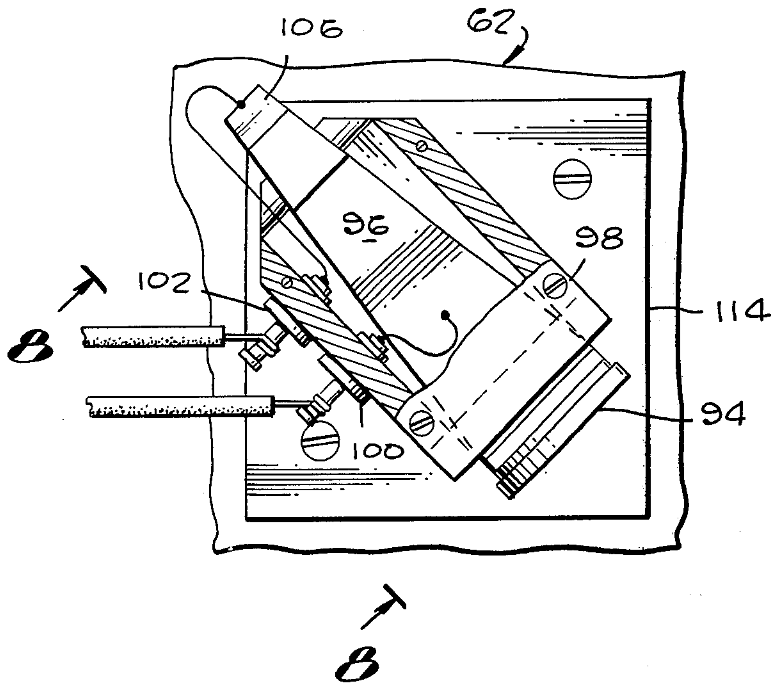
FIG. 7 is an enlarged detail view of an articulated mirror assembly according to the present invention.
Figure 8:
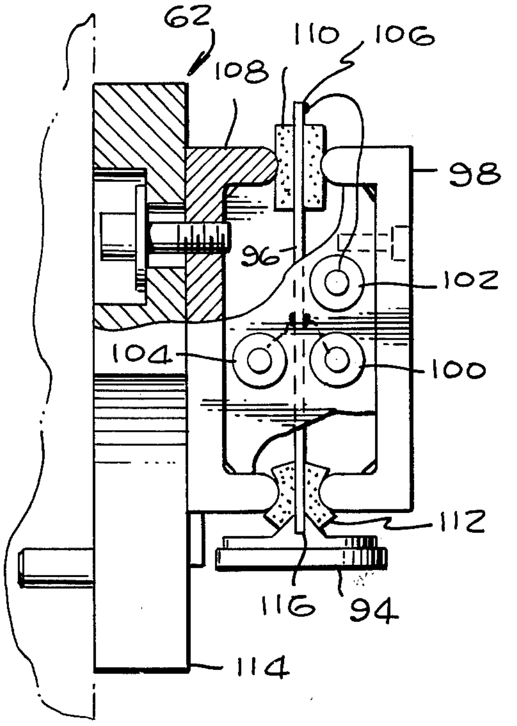
FIG. 8 is a side-section view of the articulated mirror of FIG. 7 taken along the line 8—8 in the direction of the appended arrows.

In FIGS. 7 and 8, there is shown in greater detail, the elements of the articulated mirror 62. Basically, the articulated mirror 62 disclosed and claimed in the copending Elliott application Ser. No. 333,559, supra includes a reflecting surface 94 and a piezoelectric bimorph motor-driver 96 which is mounted in a frame 98 that clamps the bimorph 96 at each end. Electrical terminals 100, 102, 104 are provided to apply electrical energy to the bimorph motor driver 96.

The bimorph is preferably a pair of sheets of a piezoelectric polycrystalline ceramic such as barium titanate or lead zirconate titanate which, when suitably polarized, expands or contracts in the presence of an applied electrical potential difference. The two piezoelectric sheets are bonded to opposite sides of a conductive flexible plate member 106 which is coupled to a source of common reference potential and which serves as a common ground.

From FIGS. 7 and 8, it will be seen that the frame 98 connects to a substantially similar frame member 108, and the bimorph 96 is clamped between the two members with an elastomer pad 110, 112 at the points of clamping. The entire assembly is fastened to a mounting bar 114 which is adjustably affixed to the player arm 20.

Figure 9:
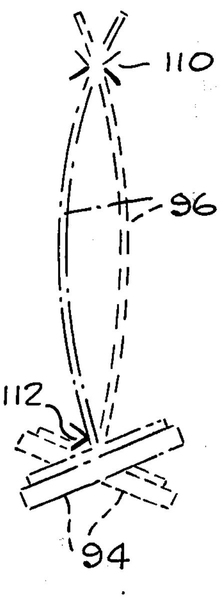
FIG. 9 is an idealized side diagram of the articulated mirror assembly in operation.

Referring next to FIG. 9 which illustrates the mirror in operation, with the front and rear elastomer pads 110, 112 holding the bimorph 96 in a relatively floating condition, applying a potential difference to the top and bottom electrodes 100, 104 with a first polarity tends to cause the piezoelectric ceramic on one side to expand and on the opposite side to contract, thereby introducing a bow into the bimorph 96. By reversing the polarity of the applied potential, an equal but opposite bow is introduced.

With the center portion between the clamps bowing, the protruding end portion 116, to which the reflecting surface 94 is bonded, tends to move in an arc about the node which is created at the line of clamping. This oscillatory motion changes the plane of the mirror surface which effectively "rocks" about a central line on the surface of the mirror 94.

By controlling the polarity and amplitude of the potential difference applied to the opposite faces of the bimorph 96, the reflecting surface 94 can be moved to change the effective point of impingement on the disc surface of the incident reading beam. Similarly, the reflected beam from the disc surface will be directed along the same optical path, but in the opposite direction.

The amount of deflection of the mirror surface 94 is directly proportional to the magnitude of the signal applied to the bimorph 96. The transfer functions can determine an appropriate servo system mechanization whereby an error signal, derived from the average intensity of the returned radiation, redirects the mirror, thereby "locking" the scan on a particular "track" on the disc. Examples of systems providing an error signal which can control the location of the beam have been shown in Gregg and Johnson U.S. Pat. No. 3,530,258, supra; and in Elliott Ser. No. 299,893, supra.

Figure 10:
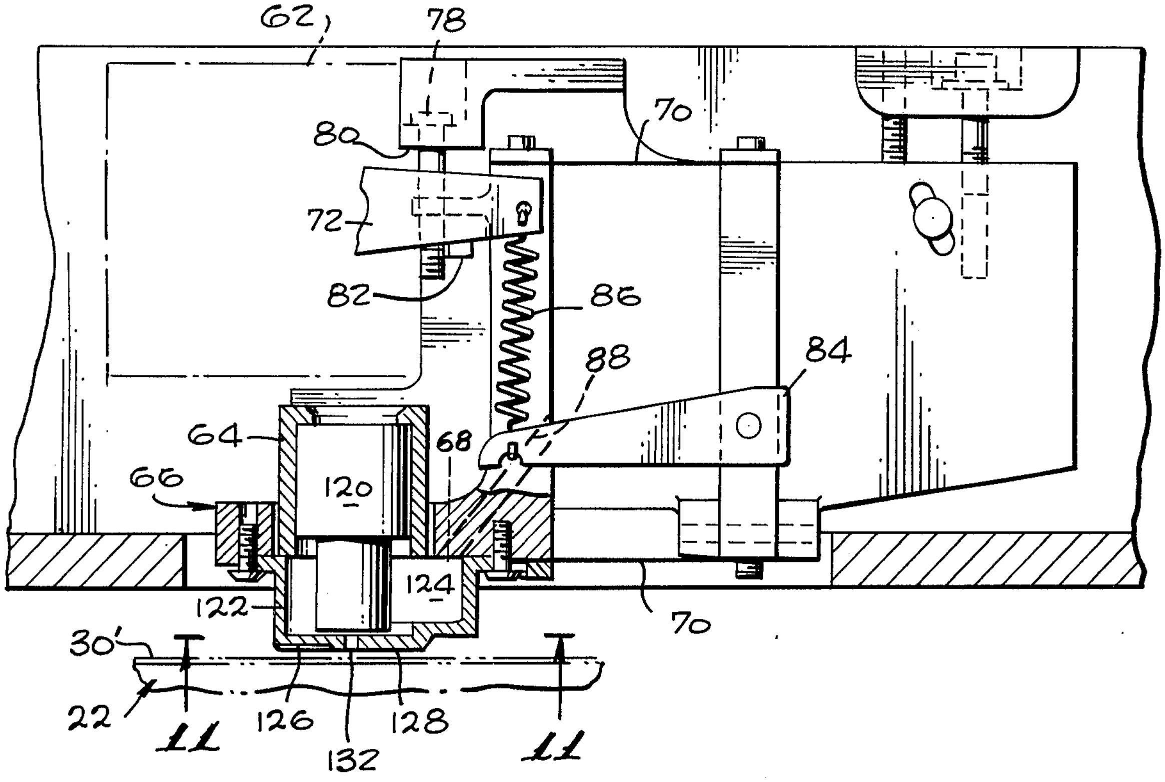
FIG. 10 is an enlarged section view of the reading head and associated apparatus of the player arm of FIG. 3.
Figure 11:
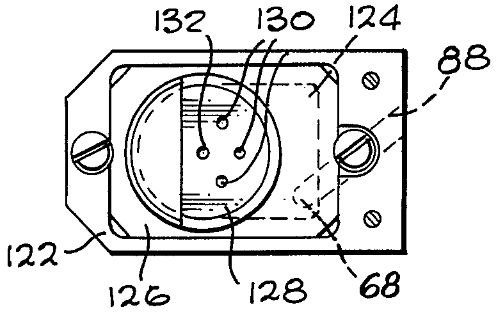
FIG. 11 is a bottom view of the reading head of FIG. 10 taken along the line 11—11 in the direction of the appended arrows.

Turning next to FIGS. 10 and 11, there is shown in greater detail, the reading head 66 according to the present invention. As seen, the reading head 66 includes a lens assembly 64 which is basically a microscope objective lens system 120 that directs the illuminating beam to a focus at the surface of the disc 30. Reflected light from the disc returns through the same optical path.

The reading head 66 includes a foot portion 122 which is substantially hollow in which the lens assembly 64 is mounted. The open, interior area of the foot portion 122 can be considered a vacuum chamber 124 which communicates to a vacuum system through orifice 68 and flexible tubing 88.

The surface of the foot portion 122 includes a step 126 which creates a hydrodynamic bearing between the video disc 30 and the foot 122. The bearing created when the disc 30 rotates acts upon the sole plate portion 128 of the foot portion 122. As is better seen in FIG. 13, the sole plate 128 is provided with a plurality of orifices 130, one of which, orifice 132, also functions as the "window" through which the radiant beam travels between the lens assembly 64 and the disc surface 30.

As in the earlier, copending Elliott application, Ser. No. 299,893, supra, the hydrodynamic bearing formed by step 126 is sufficient to support the weight of the entire reading head assembly 66. To assure appropriate spacing, various bias forces may be brought to bear upon the head assembly 66, urging it toward the surface of the disc 30. This mode of operation is, of course, preferable when dealing with the rigid video disc of the prior art or when it is necessary to read a master disc.

However, an alternative and preferred embodiment of the video disc comprises a flexible disc member 30′ which is itself supported on the turntable 22 by an air bearing. The disc 30′ therefore "floats" between the turntable 22 on the one side and the sole plate 128 of the head assembly 66 on the other.

Figure 12:
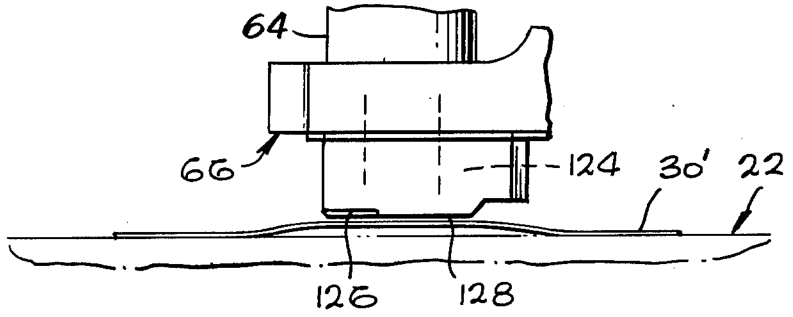
FIG. 12 is a side-section view of a preferred turntable according to the present invention.
Figure 12:
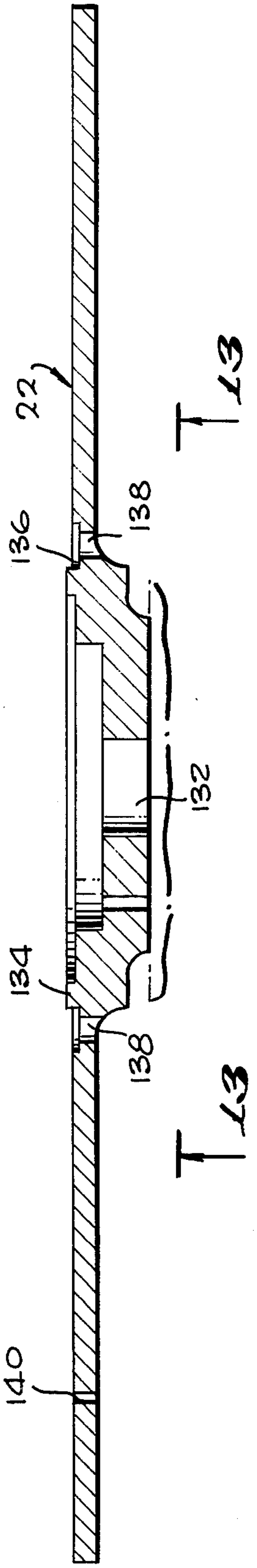
Figure 13:
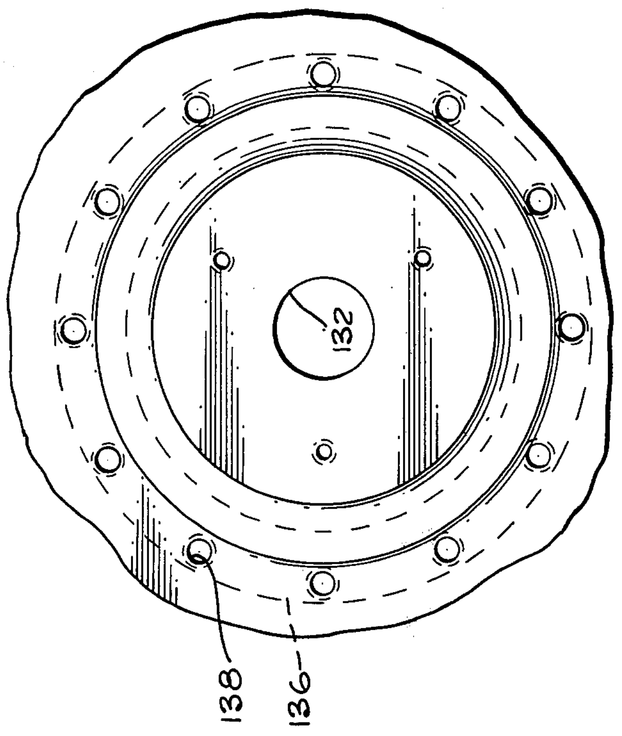
FIG. 13 is a bottom view of the turntable of FIG. 12 taken along the line 13—13 in the direction of the appended arrows.

FIGS. 12 and 13 illustrate the turntable 22 which creates such a support bearing for the disc 30′. The turntable 22 includes a central opening 132 which is adapted to receive the spindle 32 illustrated in FIG. 3. A central rim or shoulder 134 is provided about the inner area which supports the center portion of the video disc when it is clamped in place on the spindle.

An annular groove 136 is placed on the surface of the turntable 22 and is outwardly displaced from the rim or shoulder 134. An orifice 138 connects the groove 136 to the opposite side of the turntable 22 and acts as a conduit to supply air into the groove 136.

Depending upon the mass of the disc and the characteristics of the turntable at its normal rotational speed of 1800 rpm, additional, secondary orifices 140 can be located at more remote radial locations of the turntable 22, to provide an additional air supply into the area between the turntable 22 and the disc 30′.

Rotation of the turntable 22 and normal hydrodynamic forces causes a flow of fluid through the orifices 138, 140 and between the turntable 22 and the disc 30′. The air flow is directed to the outer periphery of the turntable 22. The flow is adequate to provide a fluid cushion under the disc which can support the disc against its own weight.

Should the orientation of the turntable be changed so that gravity no longer urges disc 30′ into contact with the turntable 22, the centrifugal forces on the disc 30′ would tend to hold the disc 30′ in a substantially planar orientation. The fluid bearing created between the disc 30′ and the turntable 22 would still be available to maintain a reasonably constant separation between the disc 30′ and the turntable 22.

Turning next to FIG. 14, there is shown, in somewhat idealized form and enlarged, but not to scale, the manner in which the head 66, the disc 30′ and the turntable 22 cooperate to maintain a constant predetermined spacing between the lens assembly 64 and the surface of the disc 30′. It will be noted that the lens assembly 64 is permanently positioned to be at a predetermined spacing from the interior surface of the sole plate portion 128.

A fixed and predetermined distance then exists to the exterior surface of the sole plate portion 128. Based upon the optical parameters of the system, it is desirable that the surface of the disc 30′ be at a fixed and predetermined distance from the surface of the sole plate 128 for optimum resolution of the illuminating spot.

As the turntable 22 revolves, an air cushion is created between the surface of the turntable 22 and the disc 30′. At the same time, the vacuum chamber 124 is connected to a vacuum system which evacuates the chamber and creates a negative pressure differential relative to the surface of the video disc 30′.

Accordingly, as an incremental area of the disc 30′ comes into proximity of the head 66, the negative pressure differential causes the disc 30′ to be locally deformed from its normally planar shape. The relatively higher air pressure supporting the disc 30′ on the turntable 22 and the relatively lower pressure in the vicinity of the sole plate 128 causes the disc to approach the sole plate 128, as shown. The magnitude of the vacuum within the chamber 124 determines the distance between the disc 30′ and the sole plate 128.

Since the circumferential velocity of any increment of the disc 30′ is a function of the radial distance of that increment from the center, and since the bearing created is directly related to the circumferential velocity, it is necessary to vary the magnitude of the vacuum as a function of radial displacement of the head 66. To that end, assembly 90 cooperates with a vacuum system control (not shown) so that for each radial location of the head a predetermined vacuum can be created in the vacuum chamber 124, thereby maintaining a substantially constant spacing between the surface of the disc and the sole plate 128 of the head 66.

Thus there has been shown and described an improved video disc player which includes which an improved player arm incorporating a novel articulated mirror assembly and an improved transducing head which acts as a rigid member relative to a video disc which acts as a compliant member. This is accomplished by providing a fluid cushion turntable in combination with a vacuum head that causes the disc to be deformed in the immediate vicinity of the reading head.

Other modifications and variations will appear to those skilled in the art within the scope of the present invention and, accordingly, the present invention should be limited only by the scope of the claims appended hereto.

What is claimed as new is:

1. A player for retrieving information recorded on video discs comprising in combination:

disc drive means for imparting rotational velocity to the disc;

player arm means coupled to said disc drive means for moving radially with respect to the rotating disc at a rate related to the rotational velocity of the disc;

reading beam transmission means coupled to said driven player arm for applying a reading beam from a source to the disc surface and for transmitting to a reading transducer the beam reflected from the disc surface;

movable mirror means in the path of said reading beam transmission means for radially translating the point of impingement of the reading beam on the disc surface for accurately determining the exact point of impingement of the beam on the disc surface;

said movable mirror means including a piezoelectric beam adapted to flex in a direction orthogonal to said beam axis and having a reflecting surface orthogonally mounted on a free end of said beam whereby flexing of said beam moves said reflecting surface in an arc.

2. The player of claim 1, above, wherein said disc drive means include a fluid cushion turntable for supporting the disc away from the turntable surface; and said reading beam transmission means include a transducer head adapted to create a negative pressure differential in the region between said head and the disc relative to the region between the disc and said turntable for biasing the disc into a predetermined proximity to said transducer head.

3. The player of claim 2, above, further including a pressure control system coupled to said transducer head and said player arm means for modifying the negative pressure differential as a function of player arm means radial location relative to the disc to maintain a constant head to disc spacing, whereby variations of fluid pressure as a function of circumferential velocity are accommodated by adjustments of the pressure control system.

* * * * *